United States Patent [19]

Young

[11] Patent Number: 4,777,379

[45] Date of Patent: Oct. 11, 1988

[54] POWER CYCLING APPARATUS

[76] Inventor: Danny J. Young, 951 E. 9th Ave., Broomfield, Colo. 80020

[21] Appl. No.: 667,838

[22] Filed: Nov. 2, 1984

[51] Int. Cl.$^4$ ............................................... H02J 3/00
[52] U.S. Cl. ...................................... 307/41; 307/117; 307/140; 307/141
[58] Field of Search .................................... 307/38–41, 307/116, 117, 140, 141; 361/167, 170, 191, 192, 196

[56] References Cited

U.S. PATENT DOCUMENTS

| | | | |
|---|---|---|---|
| 3,153,733 | 10/1964 | De Bolt et al. | 307/41 X |
| 3,925,680 | 12/1975 | Dixon | 307/39 |
| 3,980,943 | 9/1976 | Cailleux et al. | 307/39 X |
| 4,213,058 | 7/1980 | Townsend | 307/39 X |
| 4,242,554 | 12/1980 | Hurko et al. | 307/41 X |
| 4,409,639 | 10/1983 | Wesner | 361/196 X |
| 4,421,992 | 12/1983 | Hibbard et al. | 307/41 |

OTHER PUBLICATIONS

"Low-Cost Temperature Controller Built with Timer Circuit" by Lewis, Electronic Design 17, Aug-1975.

Primary Examiner—A. D. Pellinen
Assistant Examiner—Derck S. Jennings
Attorney, Agent, or Firm—Timothy J. Martin

[57] ABSTRACT

A cycling circuit for cycling a power source alternately between two loads provides switching circuitry having two switches interconnected between the power source and each of the loads. When each switch is in an active state, its respective load receives power, and when each switch is in an inactive state, its respective load does not receive power. A timing circuit controls the activation and deactivation of the switches so that the activation of one switch deactivates the other with the timing circuit establishing directions for each switch's active/deactive state. These durations may be set or selectively variable. A condition sensing element may also be included as part of the timing circuit so that the relative time durations vary automatically in response to environmental conditions such as temperature.

11 Claims, 2 Drawing Sheets

POWER CYCLING APPARATUS

BACKGROUND OF THE INVENTION

The present invention relates to an electrical apparatus adapted to allocate power between two or more power loads. As such, the present invention is particularly useful with loads requiring relatively high currents, and may be used in conjunction with current limit controls as an electrical energy conservation technique. In addition, the present invention may be used to control the cycles of a single appliance, such as an air conditioner, gas furnace or heat pump so as to enable those devices to operate on a more efficient basis.

Various timing devices have been used in the past to control different electrical functions. These timing devices have included both mechanical timers and electrical timing devices, including capacitive systems and digital timing systems. One example of an electronic timing device is shown in U.S. Pat. No. 2,676,052 issued Apr. 27, 1954 to Rockafellow which is adapted for controlling a welding machine. In this device, power is provided to a plurality of loads, one after another, after which the power control operation is concluded. In U.S. Pat. No. 3,470,458, issued Sept. 30, 1969 to Corey, a solid-state load control is shown that includes an adjustable time delay so that once an apparatus is turned on, there is a delay before the circuit is actually activated. The amount of time delay is determined by an adjustable RC circuit connected to a transistor.

In addition to these types of control circuits, other timing devices have been developed in the past. However, none of the devices have utilized self-toggling circuits so that a continuous, repetitive cycling may be accomplished. Further, no prior art is known by the applicant which utilizes a condition responsive device as part of the timing circuit so that the timed durations may automatically vary in response to external conditions, such as temperature. Accordingly, there is a need for an improved timing device that can regulate power in a repetitive manner among two or more loads, and a need exists for a control device that varies the duration of power supplied to different loads in a manner that responds to the environment.

SUMMARY OF THE INVENTION

It is an object of the present invention to provide a new and useful apparatus for providing electrical power to two or more loads in a self-sustaining, repetitive cycle.

Another object of the present invention is to provide a novel and useful timing apparatus for power loads that is inexpensive and reliable in operation.

Yet another object of the present invention is to provide a timing circuit wherein the duration of selected time intervals automatically varies in response to the detection of external conditions.

These objects are accomplished by the preferred embodiment of the present invention which is an apparatus that broadly functions as a power cycler or "toggling" circuit. To accomplish this, the electronic control system according to this invention is specifically adapted for cycling electric power between first and second loads. The control system broadly includes a power source which is electrically connected to the loads so that it can provide power to the loads. A switch is interconnected between the power source in each of the loads so that each switch's respective load receives power when the switch is in an active state, but the power is interrupted when the switch is in an inactive state. A timing control circuit is provided to control the activation and deactivation of the switches which are then electrically coupled to one another by the control circuitry so that when one switch is placed in an active state, the other switch is placed in an inactive state and when the other switch is placed in an active state, the first switch is placed in an inactive state. This control circuitry includes a timing circuit for activating one switch for a first time period afterwhich the second switch is placed in an active state for a second time period; the first switch is then returned to an active state upon expiration of the second time period.

Several embodiments of the timing control circuit have been developed, and include both integrated circuit timers and a transistorized RC circuit. Preferably, the switches are defined by relays of sufficient current capacity to allow the interruption and connection of a power source to a heavy electrical load thereon. The duration of the timed intervals set by the timing circuitry is determined by resistors, of either a fixed or variable type. In one form of the invention, a variable resistor is used that responds to external conditions in the environment and which may be connected to the timing circuit by which may be physically placed at a remote location with respect to the main control apparatus.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention is directed to a timing control circuit that acts as an electrical switch between a power source and a pair of loads so that it switches the power back and forth between the two loads. While this invention has been described with respect to a pair of loads, it should be appreciated by one ordinarily skilled in the art that the inventive technique described herein could be used on more than two loads as well.

Figure 1:
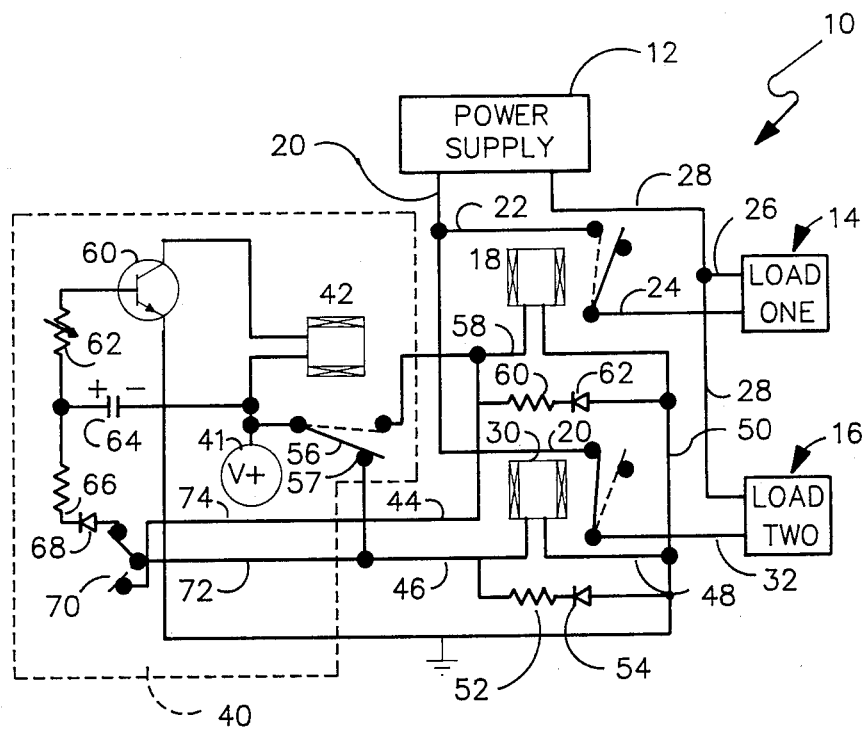
FIG. 1 is a circuit diagram of an electronic control system according to a first embodiment of the present invention employing a transistorized RC circuit as a time controller.

In FIG. 1, timing control circuit 10 is shown connected to a power supply 12 and to a first load 14 and a second load 16. Load 14 is interconnected to power supply 12 by means of relay switch 18 through electrical leads 20, 22 and 24. The circuit is completed through load 14 back to power supply 12 by means of electrical leads 26 and 28.

Similarly, second load 16 is interconnected to power supply 12 through relay 30 by means of electrical leads 20 and 32 with the circuit being completed through electrical lead 28 back to power supply 12. It may now be appreciated that relay 18 is shown in the open position in FIG. 1 so that no power is supplied to load 14. However, when relay 18 is moved to the closed position, shown in phantom, power supply 12 is connected to load 14. In FIG. 1, relay 30 is shown in a closed position so that power supply 12 is connected to load 16, but, when moved to the open position, shown in phantom, load 16 is disconnected from power supply 12.

Accordingly, the activation and deactivation of relays 18 and 30 control the powering of first and second loads 14 and 16, respectively. To accomplish this, timing control circuitry 40 is provided and is interconnected to relays 18 and 30. More particularly, timing control circuitry 40 includes its own power supply 41 represented by the V+ that is switchably connected to the windings of relays 18 and 30 through relay 42. Relay 42 is a two-position relay, so that, when relay 42 is in the position shown in FIG. 1, V+ is connected at contact 57 to the winding of relay 30. Specifically, the winding of relay 30 is connected between V+ and ground by means of electrical leads 44, 46, 48 and 50. A load resistor 52 and an indicator diode 54 are connected across the winding of relay 30 so as to register activation of relay 30.

It should be appreciated that relay 42 is biased into the position shown in FIG. 1 but, when the winding of relay 42 is powered by V+, it will cause relay 42 to move into the position shown in phantom in FIG. 1 so as to disconnect relay 30 therefrom. When relay 30 is disconnected by the movement of relay arm 56 to the position shown in phantom, relay 18 now receives power from V+ through electrical lead 58. The winding of relay 18 is connected to ground by means of electrical lead 50. A second load resistor 60 and an indicating diode 62 are mounted across the winding of relay 18 to indicate when relay 18 is activated.

It should now be appreciated that the activation of relay 42 simultaneously activates relay 18 and deactivates relay 30; when relay 42 becomes deactivated, it simultaneously activates relay 30 and deactivates relay 18. This, then, toggles power supply 12 between first load 14 and second load 16. The time durations for the activation and deactivation phases of relay 42 thus determine the time durations that power is supplied to the two loads, respectively.

Timing circuitry 40 includes circuit elements that allow the timed activation and deactivation phases for relay 42. This is predominantly accomplished by means of transistor 60, variable resistor 62 and capacitor 64. The winding of relay 42 is interconnected to ground through transistor 60 so that, when transistor 60 is non-conductive, no current flows through the winding of relay 42 so that relay 42 is in a deactivated state; when transistor 60 becomes conductive, though, the current may flow from V+ to ground through the winding of relay 42 thereby activating it and moving the lever arm 56 into the position shown in phantom in FIG. 1. Transistor 60 is preferably a NPN transistor having its emitter connected to ground and its collector connected to V+ through the winding of relay 42. The base of transistor 60 is connected to V+ through variable resistor 62, resistor 66, protective diode 68, and switch 70 as well as electrical leads 72 and 44.

The operation of the electronic control system shown in FIG. 1 can now be more thoroughly appreciated. When relay 42 is in a deactivated state and switch 70 is subsequently placed into the position shown in FIG. 1, V+ is connected both to relay 30 and to the base of transistor 60. When this happens, two things take place simultaneously. Particularly, relay 30 becomes active so that electrical power from power supply 12 is connected to second load 16. Also, transistor 60 begins to charge due to its connection with V+ as well. The time duration that it takes for transistor 60 to charge is determined by the resistance of variable resistor 62 and capacitor 64 since this RC loop determines the time constant of the charging of the transistor 60. When transistor 60 becomes fully charged, it becomes conductive. When this happens, a circuit path is completed from V+ to ground through the winding of relay 42 and transistor 60. This allows relay 42 to become active thereby moving lever arm 56 into the position shown in phantom in FIG. 1. When this takes place, relay 30 is disconnected from V+ while relay 18 is connected to V+. Thus, relay 30 deactivates and relay 18 activates to supply power from power supply 12 to first load 14. Another event takes place when lever arm 56 is moved to the position shown in phantom, however. This additional effect is that the base of transistor 60 is disconnected from V+ so that the charge on transistor 60 begins to discharge to ground through its own internal resistance. When transistor 60 discharges, it ceases to be conductive, thereby breaking the circuit between V+ and ground through the winding of relay 42. When this happens, relay 42 becomes deactivated and lever arm 56 reverts to the position shown in FIG. 1 and the cycle repeats itself. Thus, it should be understood that the time constants for the charging and discharging of transistor 60 determine the durations from power supply 12 is connected to first and second loads 14 and 16.

In order to provide power to both loads 14 and 16 at the same time, switch 70 is provided as an override to take transistor 60 out of the electrical circuit. When switch 70 is moved to the position shown in phantom in FIG. 1, V+ is directly connected to the winding relay 30 in the manner described above, but V+ is also connected by means of electrical lead 74 to the winding of relay 18. When this takes place, both relays 18 and 30 are activated so that power supply 12 is connected to both the first and second loads 14 and 16. When switch 70 is moved back to the position shown in FIG. 1, to reconnect transistor 60 into the circuit, relay 30 remains in the active state while relay 18 is deactivated. The toggling of the power takes place as described above.

It should be appreciated that other timing circuitry can be provided to toggle relay 42. Once such example is shown on FIG. 2 wherein timing control circuit 100 is provided to replace timing circuit 40 in FIG. 1. In circuit 100, relay 42 is controlled by means of a pair of integrated circuit timing chips 102 and 104. Chips 102 and 104 may be commercially available timing chips, such as NEC555 chips sold by National Semiconductor, Inc. Chips 102 and 104 are interconnected to each other and to relay 42 by means of resistors and capacitors that define the time duration that each chip is active.

Figure 2:
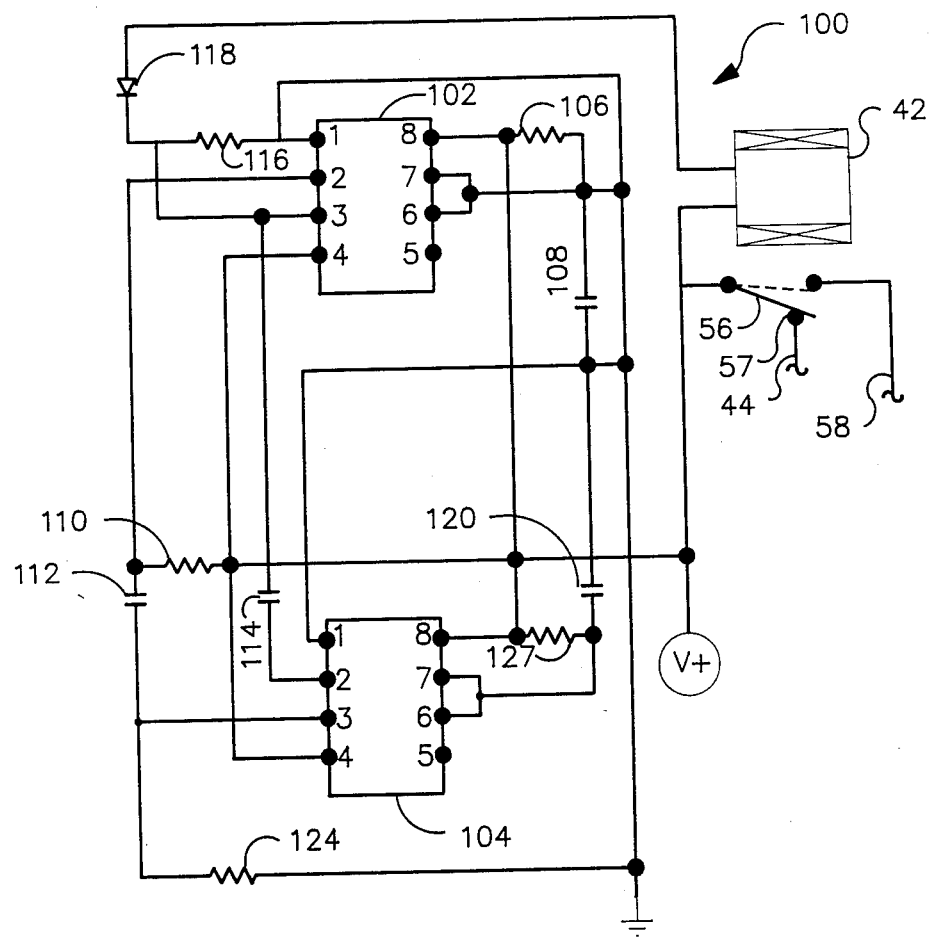
FIG. 2 is a circuit diagram of the timing control circuit according to a second embodiment of the present invention.

As is shown in FIG. 2, pins 6 and 7 of chip 102 are interconnected to each other and are connected through resistor 106 to pin 8 of chip 102. Pins 6 and 7 are also connected to ground through a capacitor 108. In this manner, resistor 106 and capacitor 108 provide a time constant for chip 102 such that, after chip 102 becomes active, it remains active for a set time delay as established by circuit elements 106 and 108. Pins 4 and 8 of chip 102 are connected directly to a positive voltage supply; pin 1 of chip 102 is connected to directly to ground. Pin 2 of chip 102 is connected to the positive voltage supply through a resistor 110 and it is also connected to pin 3 of chip 104 through a capacitor 112. Pin 3 of chip 102 is connected through capacitor 114 to pin 2 of chip 104 and is connected to ground through a resistor 116 which is a stabilizing resistance for the circuit. The winding of relay 42 is connected, on one side, to a positive voltage source and on the other side to pin 3 of chip 102 through a protective diode 118.

The circuit elements for chip 104 are symmetric with those for chip 102. Here, pins 6 and 7 are interconnected to one another and to ground through a capacitor 120; pins 6 and 7 are also connected to pin 8 of chip 104 through a resistor 122. Pin 8 is also connected directly to the positive voltage supply. In a manner similar to resistor 106 and capacitor 108, a time constant is established for chip 104 by means of capacitor 120 and resistor 122. This sets the timed duration which chip 104 becomes active upon receiving a triggering pulse. Pin 1 of chip 104 is connected directly to ground while pin 4 is connected to the positive voltage supply. Pin 2 of chip 104, as noted above, is connected through capacitor 114 to pin 3 of chip 102. Pin 3 of chip 104 is connected through resistor 124 to ground and also, as again noted above, through capacitor 112 to pin 2 of chip 102.

The operation of the timing circuit shown in FIG. 2 can now be more fully appreciated, especially as it interrelates to the operation of relay 42. For purposes of explanation, it is assumed that chip 104 is active while chip 102 is inactive. Upon the termination of the active time interval for chip 104, as determined by resistor 122 and capacitor 120, chip 104 emits a trigger signal through pin 2 in the form of an electrical pulse as connected to pin 3 of chip 102. Since chip 102 had been inactive up until this time, no current has flowed through the winding of relay 42 so that relay 42 is in the state shown in FIG. 2 with its switch arm 56 resting against contact 57. However, when pin 3 of chip 102 receives the trigger pulse from pin 2 of chip 104, pin 3 of chip 102 goes negative, thus activating chip 102 for a timed interval determined by resistor 106 and capacitor 108. When pin 3 of chip 102 goes negative, current may now flow through the winding of relay 42 so that switch arm 56 moves into the position shown in phantom in FIG. 2. After the termination of this next interval of time, chip 102 generates a trigger signal through its pin 2 that is received by pin 3 of chip 104 so that chip 104 is triggered into an active state simultaneously with the deactivation of chip 102. This toggling back and forth continues repetitively until the power supply is broken to chips 102 and 104. It should also be understood that by providing different resistances and capacitances for circuit elements 106, 108, 120 and 122, different time durations can be established for the active intervals of each of chips 102 and 104, as desired.

Figure 3:
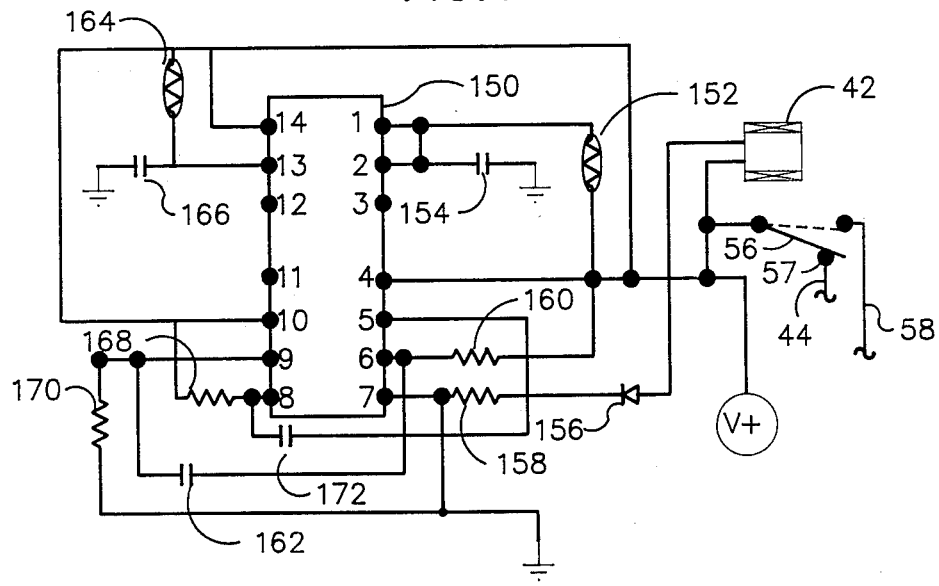
FIG. 3 is a circuit diagram of the timing control circuit according to a third embodiment of the present invention.

A second alternate embodiment of the present invention is shown in FIG. 3 and is similar to the embodiment shown in FIG. 2 except that chips 102 and 104, which were employed in the circuit shown in FIG. 2, have been replaced by a single integrated chip 150 which may be in NEC556 chip commercially available from National Semiconductor, Inc. Chip 150 is a two-stage timer and internally incorporates the circuitry of chips 102 and 104. Here, pins 1 and 2 of chip 150 are interconnected to each other and are connected to a positive voltage supply through a resistor 152 and to ground through a capacitor 154. Resistors 152 and 154 establish a time interval for activation of a first stage of chip 150. Pin 4 is connected directly to the positive voltage supply and to one side of the winding of relay 42. The other side of the winding of relay 42 is connected through a protective diode 156 and a resistor 158 to pin 7 of chip 150. Pin 5 is connected to pin 7 through resistor 158, and pin 6 is connected to the positive voltage supply through a resistor 160. Pin 6 is also connected to pin 9 of chip 150 though a capacitor 162. Pin 7 is connected directly to ground. It should thus be appreciated that pins 1 through 7 provide the same general connections as described with respect to chip 102 in FIG. 2.

Similarly, the connections of pins 8 through 14 of chip 150 correspond to chip 104 in FIG. 2. Here, pins 12 and 13 are interconnected to each other and to the positive voltage supply through a resistor 164 and to ground through a capacitor 166. Resistor 164 and capacitor 166 establish the time interval for the second stage of chip 150. Pins 10 and 14 are connected directly to the positive voltage supply with pins 8 and 10 being interconnected through a resistor 168. Pin 8 is connected, as noted above, through capacitor 162 to pin 6 of chip 150, and pin 9 is also connected through resistor 170 to ground. Pin 8 is connected to pin 5 through a capacitor 172. It should be appreciated by one ordinarily skilled in the art that a trigger pulse is generated at pin 8 of chip 150 which is presented to pin 5 to activate a first stage of chip 150. After the completion of the time duration of this first stage, pin 6 generates a trigger pulse that is presented to pin 9 so that the first stage is deactivated while a second stage is activated for a second time interval. At the conclusion of the second time interval, a trigger signal is again presented by pin 8 to pin 5 so that the self-toggling function repeats itself until the voltage supply is interrupted. Thus, the switch arm 56 of relay 42 is toggled back and forth to alternately supply power to relays 18 and 20, shown in FIG. 1.

An additional feature is shown in FIG. 3, which is not described with respect to FIGS. 1 and 2, although the principles would be the same in each of those circuits. As is shown in FIG. 3, resistors 152 and 164 are shown as conditioned responsive resistors such as thermistors which provide a variable resistance. This variable resistance makes the time duration of each time interval for stages 1 and 2 change as the resistance of their corresponding resistors 152 and 164 change. When the device is used, for example, in controlling cycles in a heat pump or furnace, the temperature of the external environment will vary the durations of the timed intervals. For example, if the external environment is quite cold, the thermistor has lower resistance so that the relay may be held in a selected position for a relatively short period of time. However, as the temperature of the external environment increases, the resistance of the thermistor increases and the time duration correspondingly increases.

Circuitry constructed with conditioned responsive resistors can be particularly useful in heating and air conditioning applications. A typical example is use of this time apparatus in controlling a heat pump or a gas forced air furnace. When a remotely located thermostat calls for heat from a heat pump or furnace, the heat pump or furnace is normally activated which initiates a burner or other such heating system. This heat energy is applied to elevate the temperature of a thermal mass which operates through a heat exchanger to elevate the temperature of the heating medium that is then supplied to a desired location, typically to a room where a thermostat is located. When the space is heated sufficiently, the thermostat signals the heat pump or furnace to cease supplying heat. However, even though the heat pump or furnace burner shuts off in response to the signal from the thermostat, a substantial amount of waste heat is present in the heat exchanger due to its thermal capacitance. The primary cause of wasted heat is due to the constant operation of the heat pump or furnace burner until the thermostat no longer calls for more heat.

When the present invention is interfaced with this system, it allows the cycling of the heat pump or furnace burner so that, once activated, it remains activated for a first duration after which it may be shut off by the time control circuitry according to the present invention. This first duration is typically selected to correspond to the time required to heat the thermal mass or heat exchanger to full thermal capacitance. After the second duration or "off" mode, the power cycler will again supply a signal to activate the heat pump or furnace burner if the thermostat still signals for heat. However, if in the interim, the temperature at the thermostat has increased to a sufficient degree, the thermostat turns off the power cycler so that the heat pump or furnace burner receives no activation signal, and the circuit resets itself. The advantage of this system is that less energy is required to heat a given space because the heat pump or furnace burner is activated only long enough to heat the thermal mass or heat exchanger to full thermal capacitance, but the heating medium is still being circulated through the thermal mass or heat exchanger so that the formerly wasted heat in the thermal mass or heat exchanger may be utilized by the heating system. If, at the end of one complete cycle, the heating medium has not sufficiently heated the environment of the thermostat so that the thermostat still calls for more heat, the heat pump or furnace burner is again activated and the power cycler repeats itself until the temperature reaches the desired maximum. By providing a thermistor to establish one or more of the time constants for the power cycler, the cycle may be automatically adjusted for both cold and warm weather. On the other hand, fixed resistors may be employed for pre-set duty cycles.

From the foregoing, it should be appreciated that the present invention will be utilized to toggle power between two loads or to regulate the power cycle within a single load. Further, it should be appreciated that either manually variable time constants may be provided for the power cycler or that condition responsive circuit elements, such as thermistors, may be provided to automatically vary the time constants in response to selected environmental conditions. Thus, it should be appreciated that the present invention is not confined to temperature responsive circuit elements, but could be employed with any condition responsive circuit elements known in the art. Further, it should be appreciated that a series of timed phases could be interconnected to one another in a closed loop fashion. For example, a plurality of chips such as chips 102 and 104 could be connected in series so that the first chip activates the second chip, the second chip the third, the third chip the fourth, and so on with the nth chip reactivating the first chip. In this manner, power could be cycled through any number of desired loads so long as the nth chip in the loop reactivated the first chip to cause the cycle to repeat.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. An electronic control system adapted for cycling electrical power between first and second loads electrically connected to a power source, comprising:

first and second switch means for switching said power source, each having an active state and an inactive state whereby said first load receives power when said first switch means is in its active state and whereby said second load receives power when said second switch means is in its active state; and timing control circuitry and a power supply therefor operative to control said first and second switch means, said first and second switch means being electrically coupled to one another by said control circuitry whereby said second switch means is placed in an active state and said first switch means is placed in an inactive state when said second switch means is placed in an active state, said control circuitry having timing means for placing said first switch means in an active state for a first selected time period after which said second switch means is placed in an active state for a second selected time period wherein said first and second time periods have selected independent durations, said control circuitry returning said first switch means to an active state upon expiration of said second time period, said timing control circuitry including a first resistor operative to establish the duration of said first time period, and a second resistor operative to establish the duration of said second time period, at least one of said first and second resistors being variable in magnitude of resistance whereby its associated time period has a variable duration.

2. An electronic control system according to claim 1 including condition response means for varying the duration of at least one of said time periods in response to changes in environmental conditions.

3. An electronic control system according to claim 2 wherein said condition response means and said one resistor are formed by a thermistor responsive to temperature changes.

4. An electronic control system according to claim 2 wherein both said first and second resistors are selectively variable in magnitude of resistance whereby said first and second time periods have selectable durations.

5. An electronic control system for cycling electrical power to a load from a power source, comprising, a switch means for electrically connecting said power source to said load, said switch means having an active state wherein said load would receive electric power from said power source in an inactive state wherein said load does not receive electric power from said power source, and timing control circuitry and a power supply therefor, said timing control circuitry operative to alternate said switch means between said active and inactive states for first and second selected time intervals having durations independent of one another, respectively, and including condition response means for automatically varying at least one of said time intervals in response to changes in environmental conditions.

6. An electronic control system adapted for cycling electrical power between first and second loads electrically connected to a power source, comprising:

first and second switch means for switching said power source, each having an active state and an inactive state whereby said first load receives power when said first switch means is in its active state and whereby said second load receives power when said second switch means is in its active state;

timing control circuitry and a power supply therefor operative to control said first and second switch means, said first and second switch means being electrically coupled to one another by said control circuitry whereby said second switch means is placed in an active state and said first switch means is placed in an inactive state when said second switch means is placed in an active state, said control circuitry having timing means for placing said first switch means in an active state for a first selected time period after which said second switch means is placed in an active state for a second selected time period wherein said first and second time periods have selected independent durations, said control circuitry returning said first switch means to an active state upon expiration of said second time period; and selectable by-pass circuit means for by-passing said timing control circuit to place both of said first and second switch means in an active state.

7. An electronic control system adapted for cycling electrical power between first and second loads electrically connected to a power source, comprising:

first and second switch means for switching said power source, each having an active state and an inactive state whereby said first load receives power when said first switch means is in its active state and whereby said second load receives power when said second switch means is in its active state; and timing control circuitry and a power supply therefor operative to control said first and second switch means, said first and second switch means being electrically coupled to one another by said control circuitry whereby said second switch means is placed in an inactive state when said second switch means is placed in an active state, said control circuitry having timing means for placing said first switch means in an active state for a first selected time period after which said second switch means is placed in an active state for a second selected time period wherein said first and second time periods have selected independent durations, said control circuitry returning said first switch means to an active state upon expiration of said second time period, said timing control circuitry including a master relay having a first position defining a first state wherein said first switch means is placed in an active state and having a second position defining a second state wherein said second switch means is placed in an active state, said timing control circuitry operative to generate a control signal for placing said master relay in said first position for said first duration and in said second position for said second duration.

8. An electronic control system according to claim 6 wherein said timing control circuitry includes a transistor having a conductive mode and a non-conductive mode, said transistor placing said master relay in said second position when in the conductive mode and in said first position when in the non-conductive mode.

9. An electronic control system according to claim 8 wherein said timing control circuitry includes an RC sub-circuit electrically interconnecting said transistor and a charging power source for defining said second duration, said RC sub-circuit operative to move said transistor from said non-conductive mode to said conductive mode when said RC sub-circuit is fully charged to define said second duration, said timing control circuitry including disconnect means for removing said RC sub-circuit from said charging power source when in the conductive mode so that it may discharge to define said first duration.

10. An electronic control system according to claim 9 wherein said disconnect means includes said master relay.

11. An electronic control system according to claim 6 wherein said timing control circuitry includes first and second integrated circuit means for generating said control signals to control said first and second durations, respectively, said first and second integrated circuits being electrically interconnected to one another whereby said first integrated circuit being active for said first duration after which it becomes passive and, at the same time, activates said second integrated circuit, said second integrated circuit being active for said second duration afterwhich it becomes passive and, at the same time, activates said first integrated circuit.

* * * * *